United States Patent [19]

Uchida et al.

[11] Patent Number: 4,863,746

[45] Date of Patent: Sep. 5, 1989

[54] PROTEINOUS MATERIAL

[75] Inventors: Yasuzo Uchida, Kanamachi; Yoichi Shirakawa, Urawa, both of Japan

[73] Assignee: Asahi Denka Kogyo Kabushiki Kaisha, Tokyo, Japan

[21] Appl. No.: 21,966

[22] Filed: Mar. 5, 1987

[51] Int. Cl.$^4$ .................. A23J 1/04; A23L 1/325
[52] U.S. Cl. .................. 426/56; 426/643; 426/657
[58] Field of Search ............ 426/56, 59, 63, 7, 643, 426/657

[56] References Cited

U.S. PATENT DOCUMENTS

| | | | |
|---|---|---|---|
| 3,041,174 | 6/1962 | Ehlert | 426/59 |
| 3,561,973 | 2/1971 | Rutman | 426/7 |
| 4,405,649 | 9/1983 | Jeffreys et al. | 426/56 |

FOREIGN PATENT DOCUMENTS 6078548  5/1985  Japan .

Primary Examiner—Marianne Cintins
Attorney, Agent, or Firm—Frishauf, Holtz, Goodman & Woodward

[57] ABSTRACT

The proteinous material of the present invention, which comprises partially decomposed but not thermally denatured fish proteins consisting of 20% or less of those having a molecular weight of more than 100,000, 20 to 50% of those having a molecular weight of 100,000 to 40,000, 20 to 50% of those having a molecular weight of 40,000 to 14,000 and 20% or less of those having a molecular weight of less than 14,000, contains large amounts of, for example, methionine and lysine in its amino acid composition, in particular in essential amino acid composition. Thus it is superior in nutritive value to vegetable proteins which contain smaller amounts of those amino acids. Further it is highly digestible by man and animals.

7 Claims, No Drawings

PROTEINOUS MATERIAL

BACKGROUND OF THE INVENTION

1. Field of the Invention:

This invention relates to a proteinous material. More particularly, it relates to a proteinous material which comprises partially denatured but not thermally decomposed fish proteins, i.e., partially decomposed fish proteins. The proteinous material of the present invention is suitable as a protein source for, e.g., foods, feeds, baits and pet foods.

2. Description of the Prior Art:

Conventional protein sources for, e.g., foods, feeds, baits and pet foods include vegetable proteinous materials such as soybeans, peanuts, cotton seeds, sesame seeds, sunflower seeds and wheat as well as defatted products obtained therefrom and materials derived therefrom and animal proteinous materials such as various milks, animal meat, fish meat, other meat and eggs as well as products obtained by processing them and materials derived therefrom. Further there are widely available proteinous materials separated from the abovementioned proteinous materials including vegetable proteins such as soybean protein and wheat protein and animal proteins such as casein, fish protein concentrate, which will be abbreviated as FPC hereinafter, and fish meal. Among these widely available proteinous materials, inexpensive vegetable ones are more frequently used However these vegetable proteins are inferior to animal ones in the nutritive value since the former contain less amounts of lysine and methionine in the amino acid composition, in particular essential amino acid component Therefore animal proteins such as fish meal are used as excellent protein sources in, for example, animal feeds Furthermore there have been provided fish meal and FPC as food products for man. However proteins contained in these fish proteinous materials for foods and feeds are thermally treated or treated with a solvent and not always satisfactory since they show poor digestibilities because thermally denatured or the free ε-amino group of lysine, which is considered to be effective as an essential amino acid binds to other active substances, which makes the proteinous materials hardly decomposable with digestive enzymes; or these products might contain trace amounts of residual solvents.

SUMMARY OF THE INVENTION

Accordingly it is an object of the present invention to provide an excellent proteinous material which is superior to vegetable proteins in the nutritive value since it contains large amounts of methionine and lysine, which are scarcely contained in the vegetable proteins, in its amino acid component, in particular in essential amino acid component; highly digestible by man and animals; and accompanied by no troubles such that the proteins are thermally denatured or some solvents remain therein.

The abovementioned object of the present invention can be achieved by providing a proteinous material which comprises partially decomposed but not thermally denatured fish proteins consisting of 20% or less of partially decomposed fish proteins having a molecular weight of more than 100,000; 20 to 50% of those having a molecular weight of 100,000 to 40,000; 20 to 50% of those having a molecular weight of 40,000 to 14,000; and 20% or less of those having a molecular weight of less than 14,000.

The proteinous material of the present invention is superior to vegetable proteins in the nutritive value since the former contains large amounts of methionine and lysine, which are scarcely contained in the latter, in its amino acid component, in particular in essential amino acid component. Further it is highly digestible by man and animals since the proteins contained therein are partially decomposed Furthermore it is not accompanied by troubles such that proteins contained therein are thermally denatured or that some solvents remains therein, as observed in the case of fish meal or FPC which are produced through some thermal treatment(s) or solvent treatment(s). Thus the proteinous material of the present invention is significantly excellent.

The proteinous material of the present invention is widely available as, for example, a substitute for soybean protein, fish meal or FPC or as a novel animal protein source for, e.g., foods, feeds, baits and pet foods.

DETAILED DESCRIPTION OF THE INVENTION

Now the proteinous material of the present invention will be described in detail.

The abovementioned partially decomposed fish proteins to be used in the present invention may be obtained by, for example, treating a starting material, selected from among (1) fish bodies from which the internals and/or skins are optionally removed; (2) optionally processed fish meat recovered from fish bodies; and (3) remnants of fishes, with a protease or autolyzing the same and separating and removing fish bones, fish oil and/or water-soluble components therefrom if required.

Examples of the abovementioned starting material include whole fish bodies of fishes captured in large quantities such as herring, sardine, mackerel, saury, round herring, Alaska pollack, flatfish, anchovy and pilchard; materials obtained by removing the internals and/or skins therefrom; fish meat recovered therefrom including minced meat and frozen minced meat; products obtained by processing them including dehydrated meat and ground meat; and remnants including those of Alaska pollack discharged from plants producing ground meat and those of, for example, bonito, tuna, salmon, trout and mackerel discharged from plants producing canned fish. In order to obtain inexpensive and excellent partially decomposed fish proteins meeting the object of the present invention, it is desirable to employ fresh whole bodies of fishes captured in large quantities When proteinous material for foods is to be produced, it is desirable to employ fish meat obtained by removing the heads, internals and/or skins from whole fish bodies or products obtained by processing the same.

Examples of the protease as used in the process of the present invention include proteinases such as acrosin, urokinase, uropepsin, elastase, enteropeptidase, cathepsin, kallikrein, kininase 2, chymotrypsin, chymopapain, collagenase, streptokinase, subtilisin, thermolysin, trypsin, thrombin, papain, pancreatopeptidase, ficin, plasmin, renin, reptilase and rennin; peptidases such as aminopeptidases including arginine aminopeptidase, oxytocinase and leucine aminopeptidase, angiotensinase, angiotensin converting enzyme, insulinase, carboxypeptidases including arginine carboxypeptidase, kininase 1 and thyroid peptidase, dipeptidases including carnosinase and prolinase and pronase; and other proteases optionally modified as well as compositions thereof These enzymes may be classified into exopeptidases, which would act from the ends of a polypeptide chain, and endopeptidases, which would act in the inside thereof, depending on the type of the action. The latter is particularly preferable.

In order to obtain the partially decomposed fish proteins to be used in the present invention, the starting material as specified above is treated with the protease as specified above or autolyzed. This treatment with the protease may be continued until the gain in soluble nitrogen after the enzymatic treatment based on the total nitrogen contained in the starting material, i.e.:

$$(Ne-No)/Nt \times 100:$$

wherein $Nt$ is the amount (% by weight) of the total nitrogen contained in the starting material;

$Ne$ is the amount (% by weight) of the soluble nitrogen contained in the product obtained by the enzymatic treatment; and $No$ is the amount (% by weight) of the soluble nitrogen contained in the product obtained by treating the starting material in the same manner except using no enzyme;

reaches 3 to 50%, preferably 5 to 40%. This enzymatic treatment may be carried out, for example, at 20 to 70° C., preferably at 30 to 60° C., for approximately five to two hours, preferably for ten minutes to hour under stirring The enzyme may be usually employed in an amount of 0.005 to 1.0% by weight based on the material to be treated.

Alternately when the starting material as specified above is autolyzed, the autolysis may be continued until the gain in soluble nitrogen contained in the autolyzed product based on the total nitrogen contained in the starting material i.e $$(Ne-No)/Nt \times 100:$$

wherein $Nt$ is the amount (% by weight) of the total nitrogen contained in the starting material;

$Ne$ is the amount (% by weight) of the soluble nitrogen contained in the product obtained by the autolysis; and $No$ is the amount (% by weight) of the soluble nitrogen contained in the starting material;

reaches 10 to 50%, preferably 10 to 40%. This autolysis may be carried out, for example, at 30 to 60° C., preferably at 40 to 60° C. for approximately 20 minutes to two hours, preferably for 30 minutes to one hour under stirring.

After inactivating the employed enzyme by various methods, fish bones and fish oil, if contained in large amounts, in the product obtained by either treating with the protease or autolyzing as described above are removed therefrom by, for example, centrifugal filtration or centrifugation. Further an aqueous solution phase containing water-soluble components is removed therefrom by, for example, centrifugation Thus the partially decomposed fish proteins available in the present invention can be obtained It is particularly preferable that the above removal procedures are successively performed with the use of a two-phase or three-phase separator.

It is required that the partially decomposed fish proteins to be used in the present invention consists of: 20% or less of those having a molecular weight of more than 100,000; 20 to 50% of those having a molecular weight of 100,000 to 40,000; 20 to 50% of those having a molecular weight of 40,000 to 14,000; and 20% or less of those having a molecular weight of less than 14,000. The ratio among these four fractions comprising proteins respectively having a molecular weight of more than 100,000, 100,000 to 40,000, 40,000 to 14,000 and less than 14,000 is determined by pouring 6 $\mu$g of a sample into an SDS/polyacrylamide gel with the use of sodium phosphate/SDS (pH 7.2) according to a method reported by Kondo et al. (cf. Seikagaku, 44, 304 (1972)); effecting electrophoresis at 40 mA for seven hours; recording an electrophoretic pattern with the use of a standard molecular weight kit (mfd. by Pharmacia Japan); forming a calibration curve thereby; determining the molecular weights of proteins contained in the sample therefrom; and determining the ratio among the abovementioned fractions with a scanning densitometer. Thus the degree of the protease treatment or autolysis and that of the removal of the aqueous solution portion containing water-soluble components from the treated product are selected in such a manner as to adjust the ratio of these four fractions to be within the range as specified above.

Thus the partially decomposed fish proteins to be used in the present invention can be obtained. It is particularly preferable that these partially decomposed fish proteins are prepared by treating fish bodies, from which the internals and/or skins are optionally removed, with a protease and separating and removing fish bones, fish oil and an aqueous solution therefrom. The obtained partially decomposed fish protein may be dried if required by, for example, lyophilization, spray-drying or air-drying.

To further illustrate the present invention, and not by way of limitation, the following Examples will be given.

EXAMPLE 1

To 1 kg of sardines, 0.3 g of a protease (Protease Amano A; mfd. by Amano Seiyaku Co., Ltd.) dissolved in a small amount of water was added and the resulting mixture was stirred at 50° C. for 30 minutes. Thus the fish meat gradually fell off from the fish bones and the whole mixture became slurry.

The gain in soluble nitrogen in the obtained slurry was determined in the following manner. Namely, 10 g of the slurry was mixed with 30 ml of water and 5 ml of a 10% solution of trichloroacetic acid was added thereto. The obtained mixture was adjusted to a volume of 50 ml with water and filtered through a filter paper (Toyo Roshi No 5 A). 10 ml of the filtrate was decomposed with sulfuric acid in a conventional manner and the soluble nitrogen contained therein was determined by the Kjeldahl method. The value thus determined was referred to as soluble nitrogen $Ne$. 2 g of the slurry was decomposed with sulfuric acid. Then the total nitrogen ($Nt$) contained therein was determined in the same manner as the one described above. Further the starting material to which no enzyme was added was maintained at 50° C. for 30 minutes. To 10 g thereof, a trichloroacetic acid solution was added and the mixture was filtered in the same manner as the one described above. 10 ml of the filtrate was decomposed with sulfuric acid and soluble nitrogen ($No$) contained therein was determined. Consequently it was found that the gain in soluble nitrogen in the abovementioned slurry, i.e $(Ne-No)/Nt \times 100$ was 24.2%.

Then the slurry was heated to 75° C. and maintained at this temperature for 15 minutes to inactivate the enzyme. Then the fish bones contained therein were removed with the use of a basket type centrifuge provided with a 6-mesh stainless gauze. Then the slurry from which the fish bones were thus removed was centrifuged at 3,000 rpm for five minutes to thereby divide the same into fish oil, an aqueous phase (stick water) and a precipitate comprising partially decomposed fish proteins. Thus a cake comprising the partially decomposed fish proteins was obtained.

This cake was lyophilized to give 130 g of partially decomposed fish proteins in the form of a powder.

Then a small amount of this dried product was thoroughly washed with cold ethanol. After distilling off the solvent in vacuo, the molecular weights of the proteins were determined by electrophoresis with the use of an SDS/polyacrylamide gel in the following manner.

According to the method reported by Kondo et al. (cf. Seikagaku, 44, 304 (1972)), 6 μg of the sample was poured into an SDS/polyacrylamide gel with the use of sodium phosphate/SDS (pH 7.2) and subjected to electrophoresis at 40 mA for seven hours. Similarly, the electrophoretic pattern of a standard molecular weight kit (mfd. by Pharmacia Japan) was recorded and a calibration curve was formed therefrom The molecular weights of proteins contained in the sample were determined from this calibration curve and the ratio among the fractions respectively having a molecular weight of 100,000 or more, 100,000 to 40,000, 40,000 to 14,000 and 14,000 or less was determined with a scanning densitometer.

As a result, it was found that the abovementioned partially decomposed fish proteins consisted of 7% of those having a molecular weight of more than 100,000, 41% of those having a molecular weight of 100,000 to 40,000, 35% of those having a molecular weight of 40,000 to 14,000 and 17% of those having a molecular weight of less than 14,000.

The starting material was subjected to the same procedure as the one described above. As a result it was found to be consisting of 34% of proteins having a molecular weight of more than 100,000, 28% of those having a molecular weight of 100,000 to 40,000, 30% of those having a molecular weight of 40,000 to 14,000 and 8% of those having a molecular weight of less than 14,000. This fact suggests that the molecular weights of the above partially decomposed fish proteins obtained by the protease treatment are lowered by the partial decomposition.

EXAMPLE 2

1 kg of sardines were stirred at 50° C. for 40 minutes. During this period, the fish meat gradually fell off from the fish bones and the whole material became slurry.

The gain in soluble nitrogen in the obtained slurry was determined in the following manner. 10 g of the slurry was mixed with 30 ml of water and 5 ml of a 10% solution of trichloroacetic acid was added thereto. The mixture was adjusted to a volume of 50 ml with water and filtered through a filter paper (Toyo Roshi No. 5A). 10 ml of the filtrate was decomposed with sulfuric acid in a conventional manner and the soluble nitrogen contained therein (Ne) was determined by the Kjeldahl method. 2 g of the slurry was treated in the same manner as the one described above to give the total nitrogen (Nt). Further 10 g of the starting material was similarly treated with a trichloroacetic acid solution and filtered 10 ml of the filtrate was decomposed with sulfuric acid and the soluble nitrogen contained therein (No) was determined. As a result, it was found that the gain in soluble nitrogen in the abovementioned slurry, i.e., $(Ne-No)/Nt \times 100$, was 16.0%.

Then the slurry was heated to 75° C. and maintained at this temperature for 15 minutes to inactivate the enzyme. Then the fish bones contained therein were removed with the use of a basket type centrifuge provided with a 6-mesh stainless gauze. The slurry from which the fish bones were thus removed was centrifuged at 3,000 rpm for five minutes to thereby divide the same into fish oil, an aqueous phase (stick water) and a precipitate comprising partially decomposed fish proteins. Thus a cake comprising partially decomposed fish proteins was obtained.

This cake was lyophilized to give 115 g of partially decomposed fish proteins in the form of a powder.

The obtained partially decomposed fish proteins consisted of 11% of proteins having a molecular weight of more than 100,000, 46% of those having a molecular weight of 100,000 to 40,000, 33% of those having a molecular weight of 40,000 to 14,000 and 10% of those having a molecular weight of less than 14,000. Application Examples 1 and 2 and Comparative Application Example 1

With the use of the partially decomposed fish proteins as obtained in Examples 1 and 2, fish farming feeds were prepared by grinding the components as shown in the following Table. For comparison, a fish farming feed was prepared in the same manner with the use of white fish meal.

| | Composition | | |
|---|---|---|---|
| Ingredient | Appl. Ex. 1 | Appl. Ex. 2 | Comp. Appl. Ex. 1 |
| Partially decomposed fish proteins prepared in Ex. 1 | 70 | | |
| Partially decomposed fish proteins prepared in Ex. 2 | | 70 | |
| White fish meal | | | 70 |
| Corn starch | 20 | 20 | 20 |
| Cellulose powder | 4 | 4 | 4 |
| Vitamin mixture | 2 | 2 | 2 |
| Mineral mixture | 4 | 4 | 4 |

50 parts of water was added to 100 parts of each feed as prepared above and thoroughly mixed together. Then the mixture was granulated with a meat chopper and given to carps of approximately 150 g in body weight. The feeding was continued for a month. Each lot contained 20 fish kept in a vinyl chloride resin tank. The following Table shows the results.

| | | Appl. Ex. 1 | Appl. Ex. 2 | Comp. Appl. Ex. 1 |
|---|---|---|---|---|
| No. of fish | initiation | 20 | 20 | 20 |
| | after 1 month | 20 | 20 | 20 |
| Average body weight (g) | initiation | 147.1 | 149.0 | 150.3 |
| | after 1 month | 226.5 | 219.7 | 197.4 |
| Body weight gain (g) | | 79.4 | 74.7 | 67.1 |
| Feed (g) | | 87 3 | 85.0 | 81.2 |
| Feed conversion ratio (%) | | 90.9 | 87.8 | 82.6 |

What is claimed is:
1. A proteinous material which comprises partially decomposed fish proteins consisting of 20% or less of partially decomposed but not thermally denatured fish proteins having a molecular weight of more than 100,000; 20 to 50% of those having a molecular weight of 100,000 to 40,000; 20 to 50% of those having a molecular weight of 40,000 to 14,000; and 20% or less of those having a molecular weight of less than 14,000.

2. A proteinous material which comprises partially decomposed fish proteins obtained by a process consisting of partially decomposing fish proteins contained in fish bodies or from fish bodies form which internals or skin have been removed by treatment with a protease enzyme for form approximately 5 minutes to 10 hours and at 20° C. to 70° C. by (a) or (b):

(a) adding 0.005% to 1% by weight of protease enzyme to the fish bodies and continuing said treating until the gain in soluble nitrogen in the product treated with the enzyme reaches 3 to 50%, based on the total nitrogen in the said fish bodies and is calculated as follows:

$(Ne-No)/Nt \times 100$:

wherein $Nt$ is the amount in % by weight of the total nitrogen contained in the starting material;

$Ne$ is the amount in % by weight of the soluble nitrogen contained in the product obtained by the enzymatic treatment; and $No$ is the amount in % by weight of the soluble nitrogen contained in the product obtained by treating the starting material in the same manner except using no enzyme; or (b) adding 0.005% to 1% by weight of protease enzyme to the fish bodies and continuing said treating until the gain in soluble nitrogen in the autolyzed product reaches 3 to 50% based on the total nitrogen in the fish bodies and is calculated as follows:

$(Ne'-No')/Nt \times 100$:

wherein $NT$ is the amount in % by weight of the total nitrogen contained in the fish bodies;

$Ne'$ is the amount in % by weight of the soluble nitrogen contained in the autolyzed product; and $No'$ is the amount in % by weight of the soluble nitrogen contained in the fish bodies; and separating and removing fish bones fish oil, water-soluble components or a combination thereof from the obtained product.

3. A proteinous material which comprises partially decomposed fish proteins obtained by a process consisting of partially decomposing fish protein contained in fish meat for from approximately 5 minutes to two hours at 20< C. to 70° C. with a protease enzyme by (a) or (b):

(a) adding 0.005% to 1% by weight of protease enzyme to the fish meat and continuing said treatment until the gain in soluble nitrogen in the product treated with the enzyme based on the total nitrogen in the starting material, reaches 3 to 50% and is calculated as follows:

$(Ne-No)/Nt \times 100$:

where in $Nt$ is the amount in % by weight of the total nitrogen contained in the fish meat;

$Ne$ is the amount in % by weight of the soluble nitrogen contained in the product obtained by the enzymatic treatment; and $No$ is the amount in % by weight of the soluble nitrogen contained in the product obtained by treating the fish meat in the same manner except using no enzyme; or (b) adding 0.005% to 1% by weight of protease enzyme to the fish bodies and continuing said treating until the gain in soluble nitrogen in the autolyzed product reaches 3 to 50% based on the total nitrogen in the fish meat and is calculated as follows:

$(Ne'-No')/NT \times 100$:

$Ne'$ is the amount in % by weight of the soluble nitrogen contained in the autolyzed product; and $No'$ is the amount in % by weight of the soluble nitrogen contained in the fish meat; and separating and removing fish oil from the obtained product.

4. The proteinous material of claim 2 wherein the decomposing of fish proteins proceeds, by autolysis, and the decomposing of fish protein is accomplished for 20 minutes to two hours.

5. The proteinous material of claim 4 wherein the autolysis is carried out until said gain in soluble nitrogen is 10 to 50%.

6. The proteinous material of claim 3 wherein the decomposing of fish proteins proceeds by autolysis and the decomposing of fish protein is accomplished for 20 minutes to two hours.

7. The proteinous material of claim 6 where in the autolysis is carried out until said gain in soluble nitrogen is 10 to 50%.

* * * * *